United States Patent
Raynor

(10) Patent No.: US 7,129,973 B2
(45) Date of Patent: Oct. 31, 2006

(54) METHOD FOR GENERATING UNIQUE IMAGE SENSOR IDENTIFICATION, AND IMAGE SENSOR SYSTEM FOR USE THEREWITH

(75) Inventor: Jeff Raynor, Edinburgh (GB)

(73) Assignee: STMicroelectronics Ltd., Buckinghamshire (GB)

( * ) Notice: Subject to any disclaimer, the term of this patent is extended or adjusted under 35 U.S.C. 154(b) by 756 days.

(21) Appl. No.: 10/156,721

(22) Filed: May 28, 2002

(65) Prior Publication Data

US 2002/0191091 A1 Dec. 19, 2002

(30) Foreign Application Priority Data

May 29, 2001 (EP) .................................. 01304718

(51) Int. Cl.
H04N 5/76 (2006.01)

(52) U.S. Cl. .................................... 348/231.3; 348/247

(58) Field of Classification Search ................ 348/241, 348/243, 231.1, 231.3, 231.6, 296, 244, 247, 348/161; 380/201, 202, 207, 227, 228, 229, 380/246; 382/141, 319; 705/56

See application file for complete search history.

(56) References Cited

U.S. PATENT DOCUMENTS

| | | | |
|---|---|---|---|
| 5,499,294 A * | 3/1996 | Friedman ..................... | 713/179 |
| 5,726,915 A * | 3/1998 | Prager et al. ................ | 702/116 |
| 6,005,936 A * | 12/1999 | Shimizu et al. ............. | 713/176 |
| 6,026,193 A * | 2/2000 | Rhoads ........................ | 382/232 |
| 6,332,193 B1 * | 12/2001 | Glass et al. .................. | 713/170 |
| 6,405,316 B1 * | 6/2002 | Krishnan et al. ............ | 713/190 |
| 6,418,223 B1 * | 7/2002 | Wootton et al. ............. | 380/246 |
| 6,594,399 B1 * | 7/2003 | Camus et al. ............... | 382/260 |
| 6,643,382 B1 * | 11/2003 | Maeda ........................ | 382/100 |
| 6,750,905 B1 * | 6/2004 | Iwami et al. ............ | 348/222.1 |
| 6,788,982 B1 * | 9/2004 | Lapstun et al. ............... | 700/94 |
| 6,968,058 B1 * | 11/2005 | Kondoh et al. ............. | 380/200 |
| 2001/0019618 A1 * | 9/2001 | Rhoads ........................ | 382/100 |
| 2002/0009197 A1 * | 1/2002 | Keyes et al. .................. | 380/54 |
| 2002/0136430 A1 * | 9/2002 | Rhoads ........................ | 382/100 |
| 2002/0191091 A1 * | 12/2002 | Raynor ....................... | 348/241 |
| 2003/0011684 A1 * | 1/2003 | Narayanaswami et al. ....... | 348/207.99 |
| 2004/0113052 A1 * | 6/2004 | Johanneson et al. .... | 250/214 R |
| 2004/0128511 A1 * | 7/2004 | Sun et al. ................... | 713/176 |

FOREIGN PATENT DOCUMENTS

| | | | |
|---|---|---|---|
| EP | | 483391 A1 * | 5/1992 |
| EP | | 0506469 | 9/1992 |

OTHER PUBLICATIONS

Cheng et al. "Fuzzy Homogeneity Approach to Multilevel Thresholding" IEEE Transactions on Image Processing, vol. 7, No. 7, Jul. 1998, pp. 1084-1088.*

(Continued)

Primary Examiner—Lin Ye
Assistant Examiner—Nelson D. Hernandez
(74) Attorney, Agent, or Firm—Lisa K. Jorgenson; Allen, Dyer, Doppelt, Milbrath & Gilchrist, P.A.

(57) ABSTRACT

A method is for generating a key from the fixed pattern noise (FPN) of a CMOS image sensor to be used in generating a digital authentication signature. The key may be generated by temporarily disabling the FPN cancellation circuit that is conventionally included in the system, and generating a substantially "black" image to produce a digitized FPN signal. The key may then be generated from characteristics of the FPN, such as by comparing pairs of pixels, for example.

37 Claims, 7 Drawing Sheets

OTHER PUBLICATIONS

Kurosawa, Kenji et al., "CCD Fingerprint Method—Identification of a Video Camera from Videotaped Images", 1999, IEEE, pp. 537-540.*

Geradts,, Zeno J, "Methods for Identification of images acquired with Digital cameras", 2001, SPIE, vol. 4232, pp. 505-512.*

Burns, Peter D. et al., "Distilling Noise Sources for Digital Capture Devices", 2001, Eastman Kodak Company, NY, pp. 132-136.*

Burns, Peter D. et al., "Identification of Image Noise Sources in Digital Scanner Evaluation" 2004, SPIE, vol. 5294, pp. 114-123.*

* cited by examiner

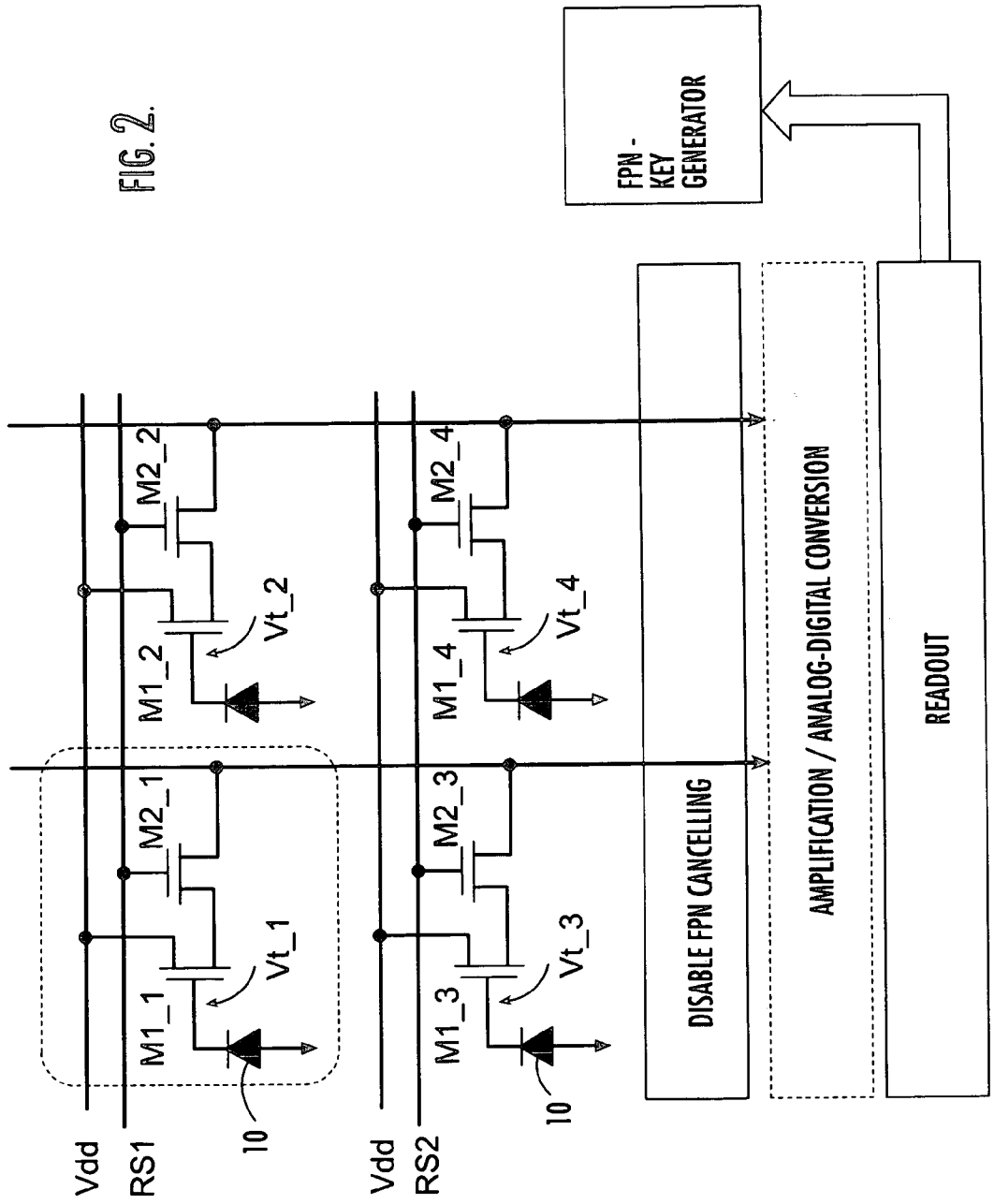

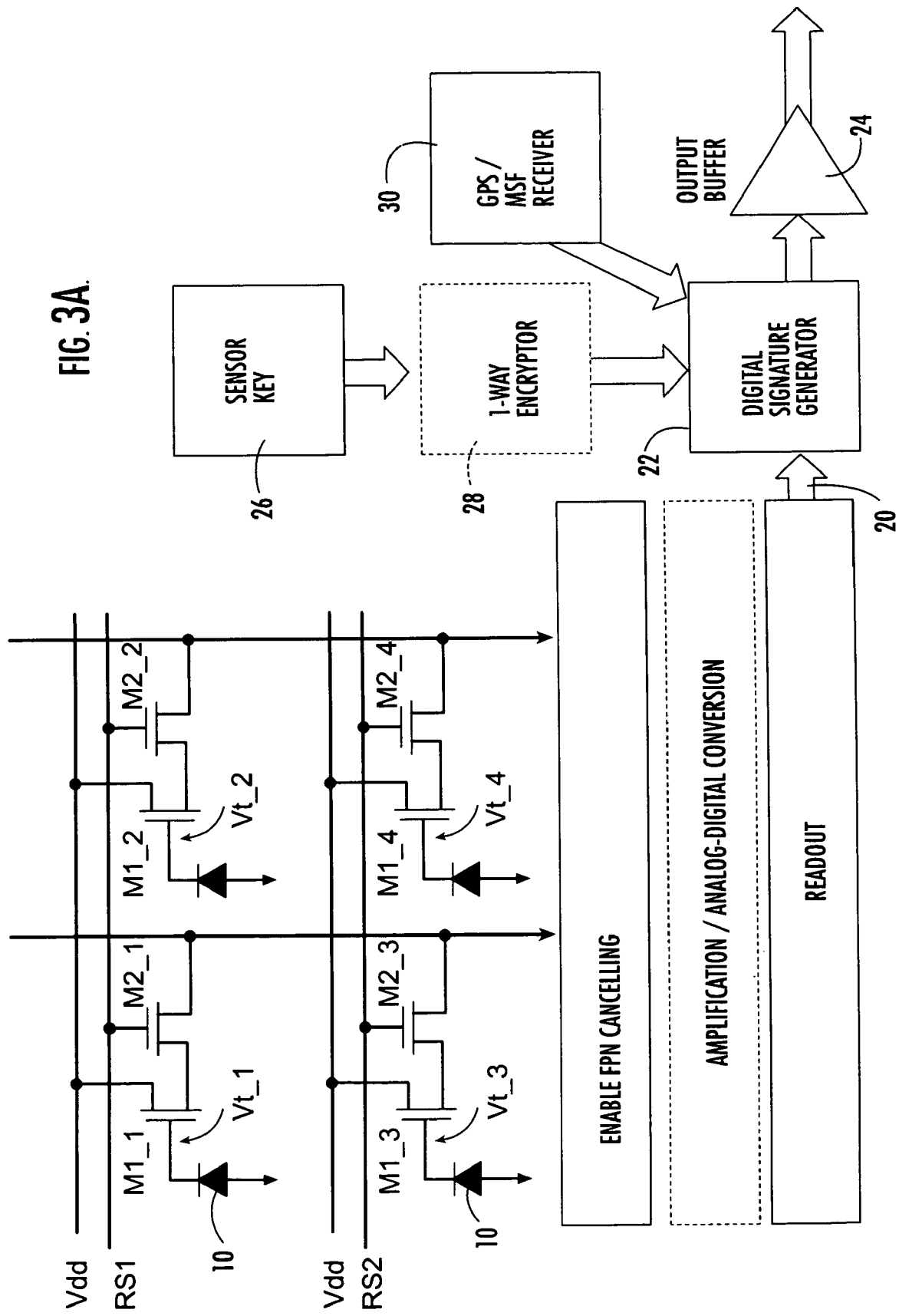

METHOD FOR GENERATING UNIQUE IMAGE SENSOR IDENTIFICATION, AND IMAGE SENSOR SYSTEM FOR USE THEREWITH

FIELD OF THE INVENTION

This invention relates to the field of image sensors, and, more particularly, to an image sensor system and related method for generating a unique identification which can be used to establish that a given image or series of images has originated from a particular image sensor.

BACKGROUND OF THE INVENTION

There are many situations in which it is desirable to prove that a still or video image has been produced by a particular image sensor. Moreover, with the widespread availability of digital imaging technology, it may be necessary to prove that the image in question is original and has not been digitally manipulated after being captured.

There are a number of prior art proposals for improving the security and authenticity of images, some of which are based on the use of encryption keys, such as those disclosed in U.S. Pat. Nos. 5,499,294; 5,799,082; and 5,828,751, for example. In U.S. Pat. No. 5,499,294, a process is disclosed in which a unique key is calculated for each sensor and this key is stored in the sensor during manufacture in a specially provided ROM. Such methods thus require additional circuitry that is programmable, and correspondingly require a programming step to be carried out during manufacture, both of which may result in increased costs.

SUMMARY OF THE INVENTION

The present invention is based on generating and using a unique encryption key in a simple and cost effective manner. The invention provides a method of generating a unique identification for an image sensor of a type which produces fixed pattern noise. The method may include using a measurement of the fixed pattern noise to generate a numeric key, and attaching a digital signature to one or more images output by the image sensor. The digital signature may be generated by combining the key and image data according to a predetermined algorithm.

The invention also relates to an image sensor system which may include an image sensor having an array of pixels forming an image plane. The pixels may have a light sensitivity which varies from one pixel to another in a non-predictable manner to produce fixed pattern noise (FPN) unique to that image sensor. The system may also include at least one FPN cancellation circuit connected to receive the output of the image sensor, and at least one analog-to-digital converter receiving the output of the FPN cancellation circuit to produce a digital image signal. Furthermore, the system may include a digital signature generator which acts upon the digital image signal to incorporate therein a digital signature generated in accordance with a digital key. The digital key may be a function of the fixed pattern noise, for example.

BRIEF DESCRIPTION OF THE DRAWINGS

Various embodiments of the invention will now be described, by way of example, with reference to the drawings, in which:

FIG. 2 is a schematic diagram of an image sensor system in accordance with the present invention;

FIG. 3A is a schematic block diagram illustrating the image sensor system of FIG. 2 in greater detail;

DETAILED DESCRIPTION OF THE PREFERRED EMBODIMENTS

Figure 1:
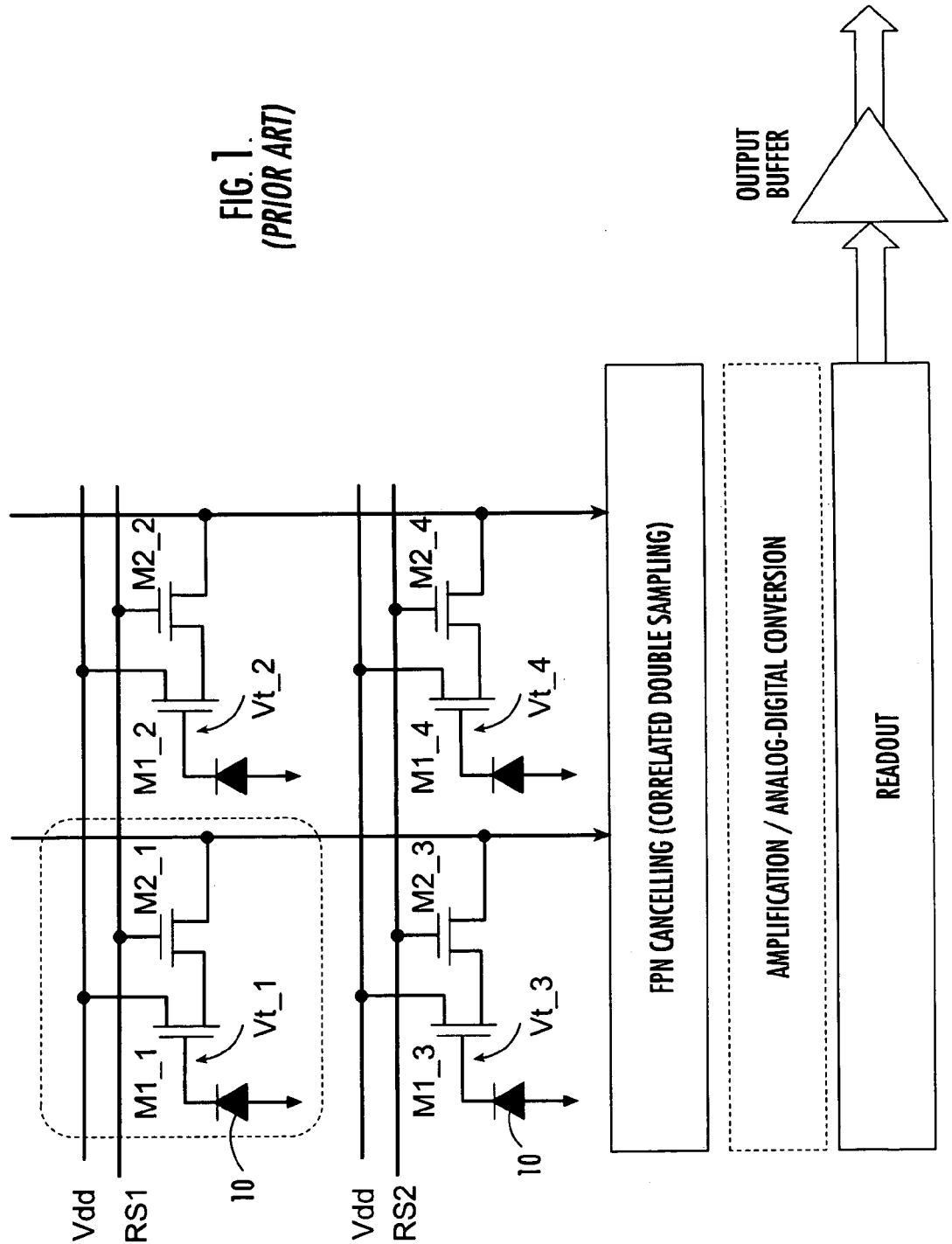
FIG. 1 is a schematic diagram of a prior art image sensor.

Referring to FIG. 1, a prior art CMOS-based integrated circuit image sensor is illustratively shown which has an array of pixels (only four of which are shown). Each pixel has a photosensitive element such as photodiode 10 and associated sense transistor M1 and reset transistor M2. As is well known in the art, it is equally possible to have a single transistor M1 per pixel, or to have additional transistors such as photogate transistors.

The sense transistor M1 has an inherent voltage drop Vt, known as the "threshold voltage", between its source and gate. The voltage drop Vt varies from one transistor to another as a result of manufacturing tolerances of factors such as oxide thickness and doping concentration. The signal available for a given pixel at the output is the photo-generated current minus Vt. The voltage drop Vt can vary between transistors by as much as −/+ 100 mV in a voltage swing of 0.5–1.0 V.

Thus, variations in Vt across the array can cause large variations in image brightness known as fixed pattern noise (FPN). This is unacceptable, and it is typical to employ a mechanism to eliminate FPN. This is often combined with another noise canceling technique, i.e., correlated double sampling. Using this technique, the reset value of the pixel is measured and stored. The signal value of the pixel is measured and subtracted. The subtraction cancels out the Vt as follows:

(1) Reset_Signal=Vreset+Vreset_noise−Vt;

(2) Pixel_Signal=Vreset+Vreset_noise−Vt−PhotoSignal; and (3) Reset_Signal−Pixel_Signal=PhotoSignal.

These signals are then typically amplified and converted to digital form before being read out.

It will be understood that FPN cancellation and analog-digital conversion may be carried out in a number of ways. Image sensors may have one or more FPN circuits and one or more A/D converters (e.g., one per chip, one per column).

The present invention is based on the realization that the FPN for any image sensor is unique to that sensor. Referring to FIG. 2, the invention operates by temporarily disabling the FPN correction and reading out the FPN as a unique set of characteristics to be used in generating a key for use in creating digital signatures. This procedure may be performed during camera turn-on. It is not necessary to perform this more often, which would reduce the throughput of the camera, especially in video (i.e., motion video) systems. The procedure may be carried out at each turn-on, and the result stored in a memory, or it may be performed only at the first power-on and the result stored in a permanent memory such as a flash/OTP ROM.

The FPN, and hence the key, is produced as a result of the manufacturing process and is a feature of the most delicate part of the pixel. Once a sensor has been produced, it is practically impossible to alter it, at least without overt damage to the pixel.

A practical image sensor has a large number of pixels, typically ranging from 100,000 for WebCam or low-quality TV to 3,000,000 for a high-end digital still camera. Thus the chances of two sensors having the same FPN is remote. If six pixel elements are used to produce a single key bit, even a low-end sensor with 100,000 pixels can generate a key of $2^{16,666}$ or $10^{5000}$, which is an enormous number. Hence, the chance of any two sensors having the same key is extremely remote. Various ways of producing the key from the FPN data are discussed below.

Operation of the system once the key has been generated will now be described with reference to FIG. 3A. The FPN cancellation is enabled once more, so that the image signals undergo FPN cancellation, amplification, and A/D conversion to produce a conventional digital signal at readout output 20. This signal is then further processed to produce a digital signature using a digital signal generator 22 before being transmitted from the system via an output buffer 24.

The particular form of digital signature generation used is not significant in carrying out the invention. For example, the methods used in the above-cited U.S. Patents could be used. As illustrated in FIG. 3A, one approach is to retrieve the key from a storage device 26 and encrypt the key using an encryptor 28 implementing a one-way algorithm. The encrypted key is then applied to the image data as it is read out at 24 to generate the digital signature. This may be tagged to the end of the picture information as a discrete digital signature, or it may be embedded within the picture information (i.e., watermarking).

In either case, each image has attached to it a unique digital signature which can be used to verify that image sensor as the source of the image by decoding using the appropriate algorithm and comparison with an encrypted key from that sensor. The digital signature can also verify that the image has not been altered by checking the consistency of the image data with the signature.

It is also frequently desirable to be able to prove the time of an occurrence, or to prove that a series of images (which might be successive still images or a portion of motion video) occurred in a given sequence which has not been altered. The embodiment of FIG. 3A accomplishes this by including time information in the digital signal generation. The time information is suitably derived from an external source by a receiver 30, which may be an MSF receiver for MSF time reference radio broadcasts. Alternatively, a GPS receiver may be used to extract the time information encoded in GPS satellite signals.

The time information could be generated off-chip, but this would provide opportunities to falsify the signal. It is therefore preferred for the time information to be generated on-chip and for the whole system to be included on a single chip. In this case, the time information may be derived from a free running clock circuit on-chip, which is synchronized periodically by the MSF or GPS signal.

Figure 3B:
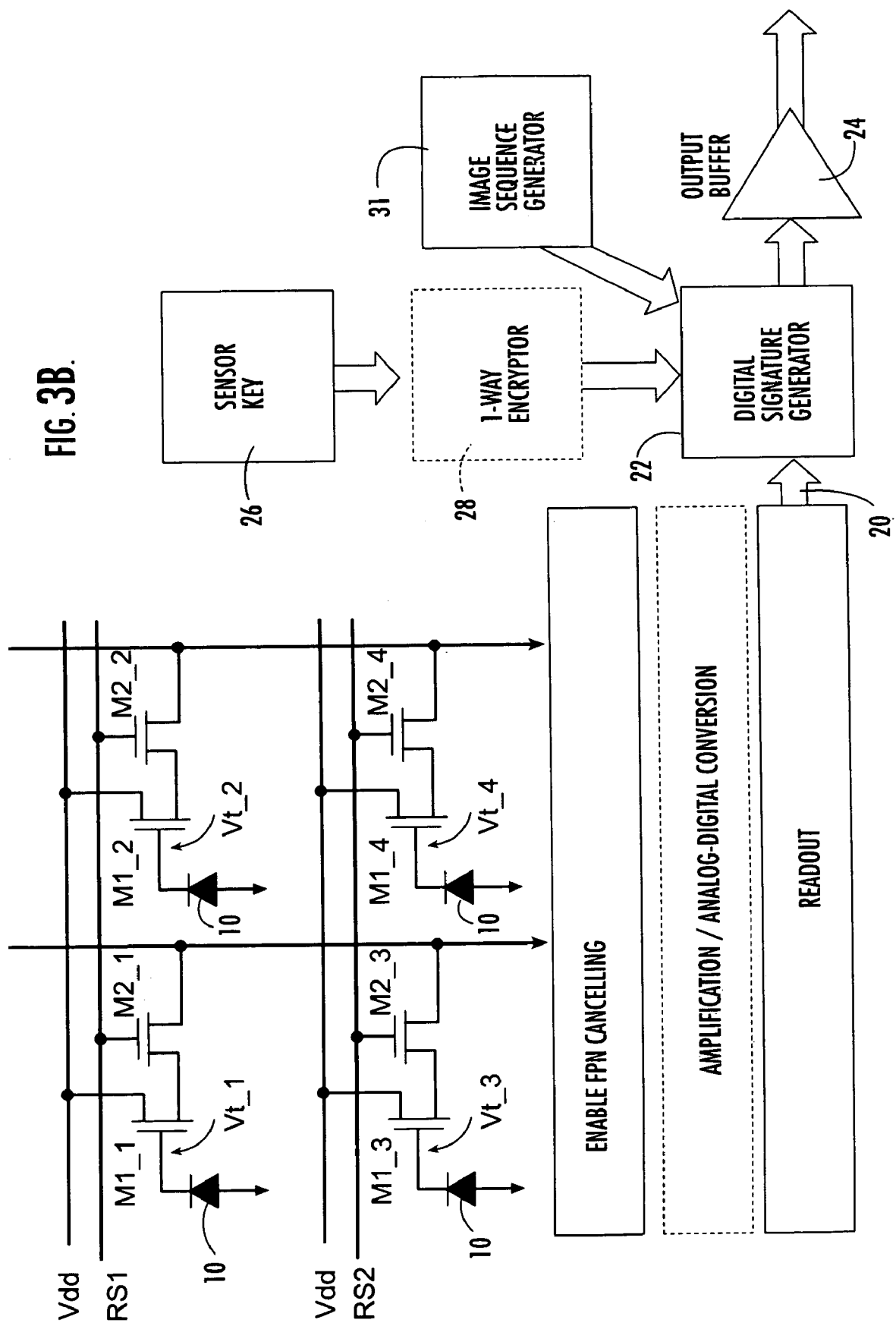
FIG. 3B is a schematic block diagram illustrating an alternate embodiment of the image sensor system of FIG. 3A.

As a simpler alternative in some circumstances, the sequence of a series of images can be verified by generating a sequence of numbers and including these numbers during digital signature generation in place of the time information as described above. This embodiment is illustrated in FIG. 3B, in which the receiver 30 of FIG. 3A is replaced by an image number sequence generator 31. The sequence generated could, for example, be reset at each power-on and could be a simple arithmetic series (e.g., 0, 1, 2, . . . etc.), or the output from a pseudo-random number generator.

Figure 4:
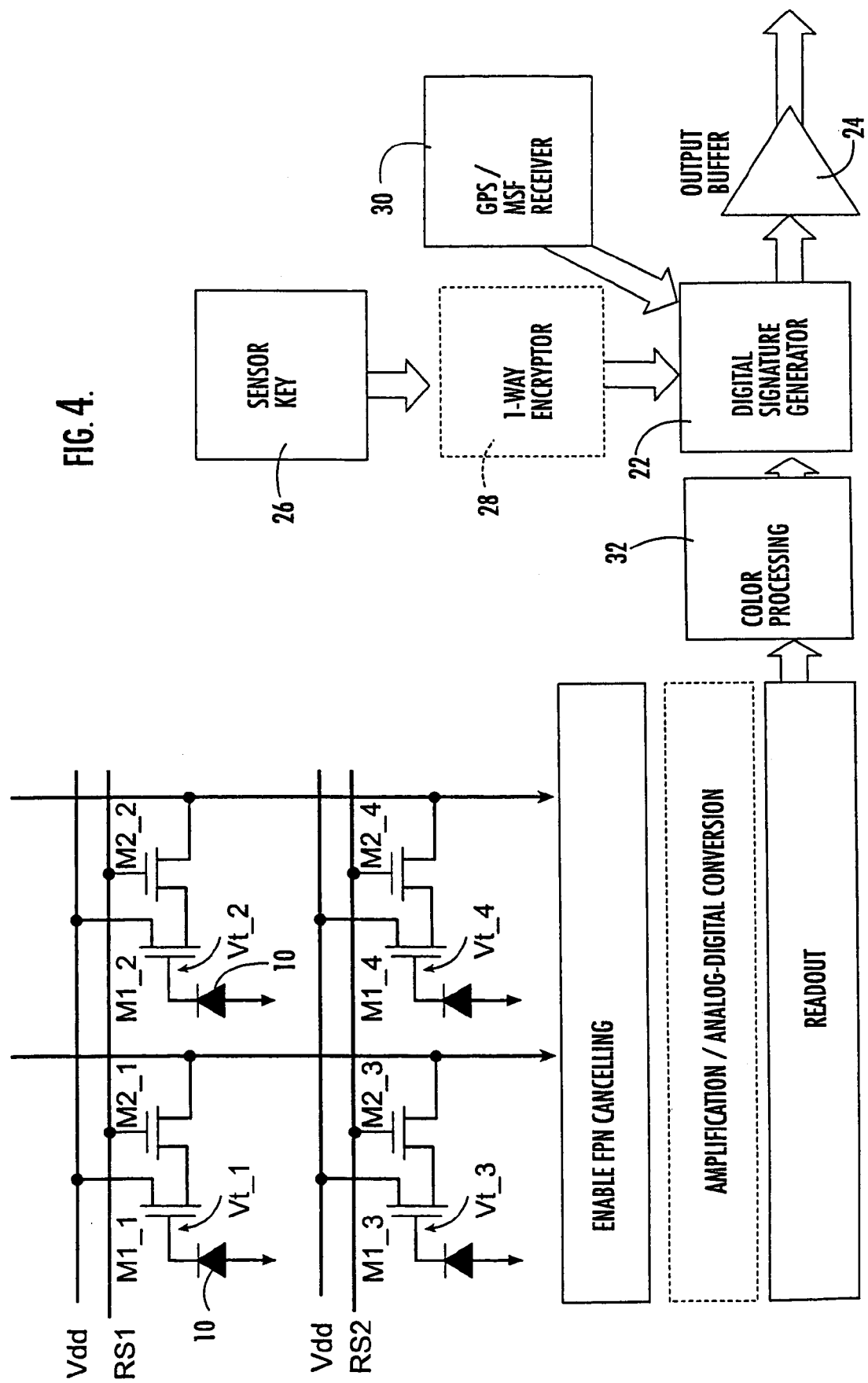
FIG. 4 is a schematic block diagram of another alternate embodiment of the image sensor of FIG. 3A.

The system as thus far described will cause an image to be identified as invalid if it undergoes any processing after leaving the output buffer. It is common practice when dealing with color systems to use post-processing of the signal after it leaves the image sensor chip. Therefore, as seen in FIG. 4, where color processing is desirable this may be performed by a color processor 32 between the readout and the digital signal generator 22. Although the present invention is not limited to the entire system being on a single chip, this is the most secure way of implementing the invention, which is practical using modern, high-density CMOS technology. See, e.g., S. G. Smith et al., "A Single-Chip CMOS 306×244 Pixel NTSC Video Camera and a Descendant Coprocessor Device", IEEE Journal Solid State Circuits, Vol. 33, No. 12, pp. 2104–2111, December 1998.

Various methods of generating the key from the variations in Vt will now be described. It should be noted that there are many robust generation methods, and certain examples of which will be described herein, though others may also be used. All of these methods typically require the measurement of the FPN. This is achieved by disabling the FPN correction system and taking a reference image.

The reference image may be a "black" image, which may be obtained by closing a shutter, if the image sensor forms part of a camera provided with a shutter. However, a shutter may not be practical, in which case a black image may be provided by reducing to a minimum the time during which the array is light sensitive. This can readily be as little as 1 μs, which will be sufficiently small to render the array insensitive. Alternatively, the reference image may be an image obtained using some other predetermined illumination conditions (including zero or substantially zero illumination).

It is important to note that the absolute level of Vt will vary with environmental conditions such as temperature and current through the sense transistor. However, the relative values will not change. That is, Vt_a may vary between 550 mV and 580 mV, but if Vt_a>>Vt_b this relationship will remain even if the temperature of the device varies.

Figure 5:
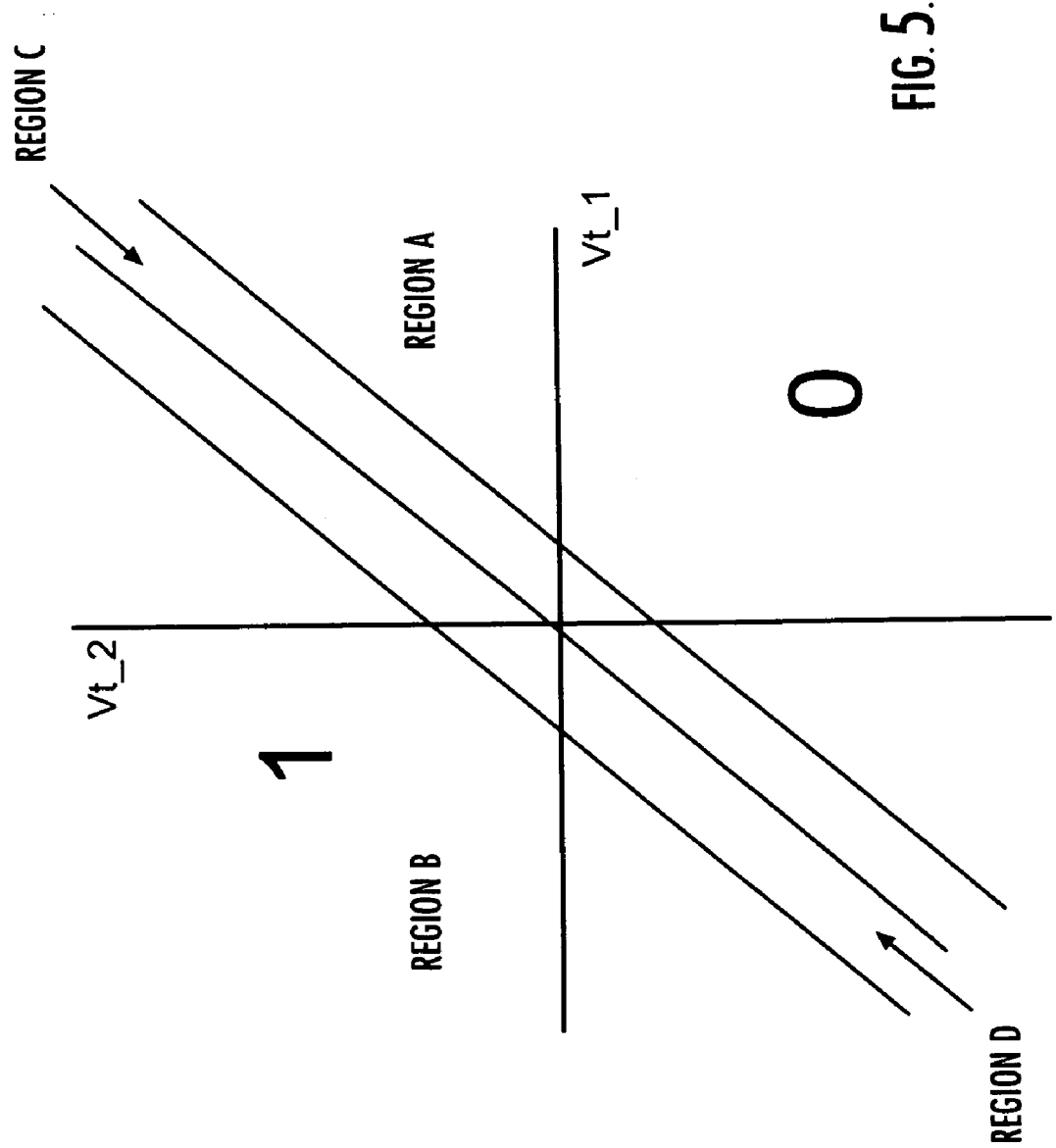
FIG. 5 is a graph illustrating a method of deriving a key from sensor pixel signals in accordance with the present invention.

This factor is used in a first method now described with reference to FIG. 5. Pairs of pixels are compared. The number of pairs compared depends on the number of bits required for the key. The comparison used in this first method is:

If Vt_a−Vt_b>threshold (region A), then output is 0;
If Vt_b−Vt_a>threshold (region B), then output is 1; and
If Vt_a−Vt_b<threshold (region C) or Vt_b−Vt_a<threshold (region D), then the two threshold voltages are too close and this pair of pixels is ignored.

A typical level of the threshold value would be 50 mV. One modification of this technique is to read out a number of images and average them, which reduces the amount of noise.

Figure 6:
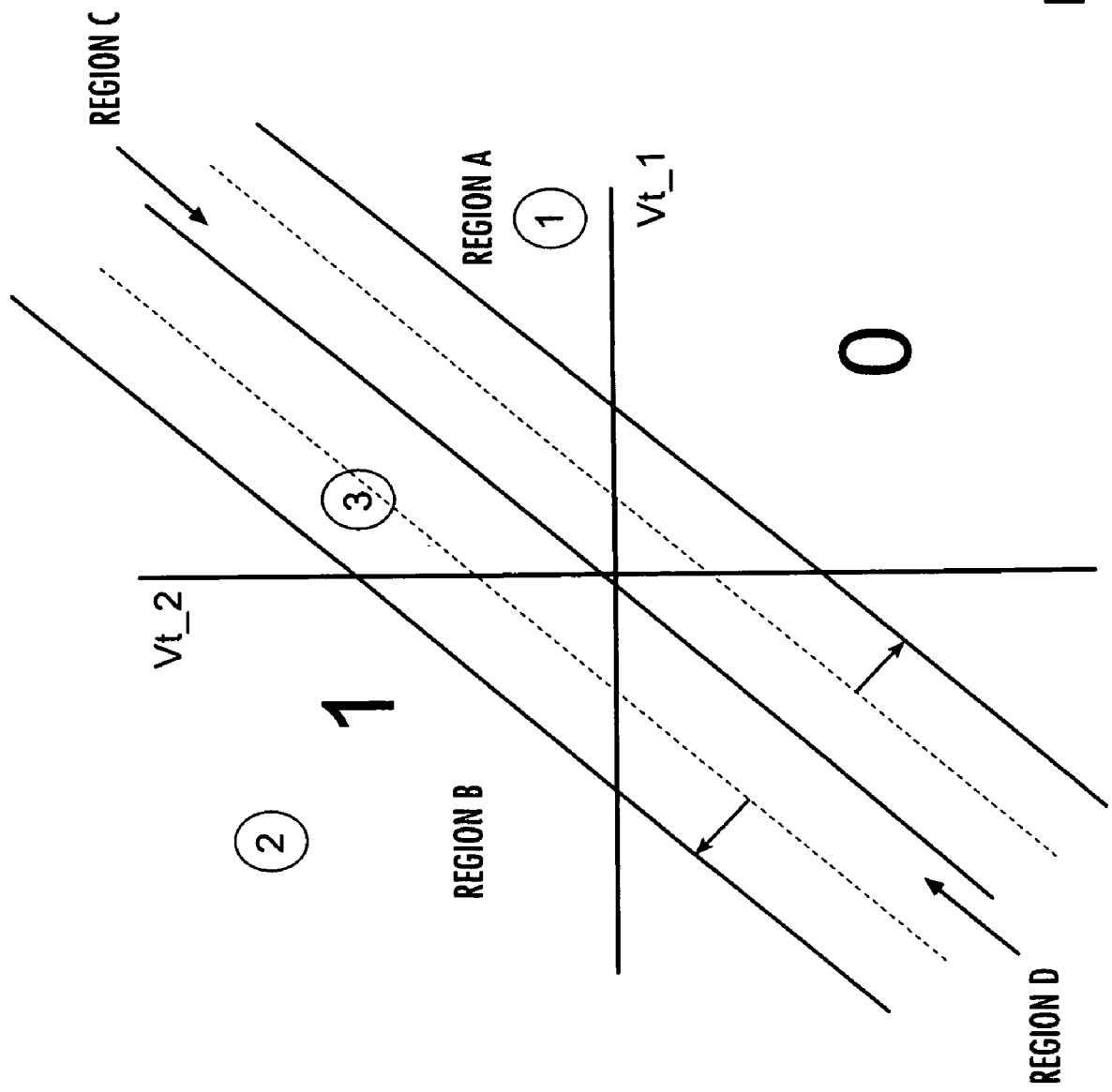
FIG. 6 is a graph illustrating an alternate embodiment of the method illustrated in FIG. 5.

The foregoing method uses a fixed, predetermined threshold which does not take into account the conditions of the camera device. One alternative illustrated in FIG. 6 is to use an iterative process in which the threshold is increased. As this is done, an increasing number of pairs is classified as undecided, and the process is repeated until a desired number of pairs remains.

For example, in the example illustrated in FIG. 6 it is desired to have a key generated from two pairs. Three pairs of pixels are compared and result in the values 1 (clearly in region A) and 2 (clearly in region B). Pair 3, however falls close to the original threshold (dotted line). It would thus be classified with the original threshold as region B, but as the threshold is increased pair 3 is dropped out as undecided. This example allows six pixels to produce two, unambiguous bits of data. Obviously, a practical example would use a much larger set of pixels, but the principle would be the same.

In both of the foregoing methods, if a comparison is close to the threshold then a very small change will change the sensor key bit. A more robust method can be achieved using a fuzzy logic approach. With this technique a single dividing line is replaced by using a number of pairs of pixels to produce a single, but more reliable, sensor key bit. See, e.g., H. D. Cheng et al., "Fuzzy homogeneity approach to multilevel thresholding", IEEE Trans. Image Processing, Vol. 7, no. 7, pp. 1084–1088, July 1998. More generally, each of the binary digits of the key can be generated by measuring and processing a plurality of pixel signals.

It is preferred that the entire system is implemented as a single chip both for economy of manufacture and enhanced security, as noted above. It is possible, however, for one or more elements of the system to be provided as separate circuits. The invention therefore provides an improved and simplified way to verify the source of images.

That which is claimed is:

1. A method for generating a unique identification for an image sensor for generating image data and being of a type which produces fixed pattern noise, the method comprising:
   generating a sensor key using a measurement of the fixed pattern noise of the image sensor;
   generating a digital signature based upon the sensor key and image data from the image sensor using an algorithm; and
   attaching the digital signature to at least one image output by the image sensor.

2. The method of claim 1 wherein the image sensor comprises a plurality of pixels; and wherein generating the sensor key comprises generating the sensor key based upon pixel signals produced by the image sensor under predetermined illumination conditions.

3. The method of claim 1 wherein the sensor key comprises a plurality of binary digits; and wherein generating the sensor key comprises generating each of the plurality of binary digits by measuring and processing a respective plurality of pixel signals produced by the image sensor.

4. The method of claim 3 wherein generating each of the plurality of binary digits comprises comparing a given pair of pixel signals.

5. The method of claim 4 further comprising ignoring any given pair of pixel signals if values thereof do not differ by more than a predetermined threshold.

6. The method of claim 1 further comprising associating with the at least one image a time at which the at least one image was taken.

7. The method of claim 6 wherein associating comprises including the time the at least one image was taken in the digital signature.

8. A method for generating a unique identification for an image sensor for generating image data and being of a type which produces fixed pattern noise, the method comprising:
   generating a sensor key using a measurement of the fixed pattern noise of the image sensor;
   generating a digital signature based upon the sensor key; and
   attaching the digital signature to at least one image output by the image sensor.

9. The method of claim 8 wherein the image sensor comprises a plurality of pixels; and wherein generating the sensor key comprises generating the sensor key based upon pixel signals produced by the image sensor under predetermined illumination conditions.

10. The method of claim 8 wherein the sensor key comprises a plurality of binary digits; and wherein generating the sensor key comprises generating each of the plurality of binary digits by measuring and processing a respective plurality of pixel signals produced by the image sensor.

11. The method of claim 10 wherein generating each of the plurality of binary digits comprises comparing a given pair of pixel signals.

12. The method of claim 11 further comprising ignoring any given pair of pixel signals if values thereof do not differ by more than a predetermined threshold.

13. The method of claim 8 further comprising associating with the at least one image a time at which the at least one image was taken.

14. The method of claim 13 wherein associating comprises including the time the at least one image was taken in the digital signature.

15. The method of claim 8 wherein generating the digital signature comprises generating the digital signature based upon the sensor key and image data from the image sensor.

16. An image sensor system comprising:
   an image sensor comprising an array of pixels forming an image plane for generating image data, the pixels having a light sensitivity which varies from one pixel to another in a non-predictable manner resulting in fixed pattern noise (FPN) unique to said image sensor;
   at least one FPN cancellation circuit for providing an output based upon the image data;
   at least one analog-to-digital converter for producing a digital image signal based upon the output of said at least one FPN cancellation circuit; and
   a digital signature generator for generating a digital signature based upon a sensor key and incorporating the digital signature in the digital image signal, the sensor key being a function of the FPN of said image sensor.

17. The image sensor system of claim 16 further comprising:
   means for disabling said at least one FPN cancellation circuit so that the digital image signal produced by said at least one analog-to-digital converter includes FPN;
   a key generation circuit for generating the sensor key based upon the digital image signal including the FPN; and
   a memory for storing the sensor key.

18. The image sensor system of claim 17 wherein the sensor key comprises a plurality of binary digits; and wherein said key generation circuit generates each digit of the sensor key by measuring and processing signal values of respective pluralities of pixels.

19. The image sensor system of claim 16 further comprising a timing circuit connected to said digital signature generator for generating timing information;
   and wherein said digital signature generator generates the digital signature based upon the sensor key and the timing information so that the digital image signal for each image output by said image sensor includes information defining a time when the image was taken.

20. The image sensor system of claim 19 wherein said timing circuit comprises a receiver for receiving time reference broadcast signals.

21. The image sensor system of claim 19 wherein said timing circuit comprises:
a clock; and
a receiver for intermittently receiving time reference broadcast signals for synchronizing said clock.

22. The image sensor system of claim 16 further comprising a number sequence generator connected to said digital signature generator for generating a number sequence; and wherein said digital signature generator generates the digital signature based upon the sensor key and the number sequence so that the digital image signal for each image output by said image sensor includes at least one number from the number sequence.

23. The image sensor system of claim 16 wherein said image sensor, said at least one FPN cancellation circuit, said at least one analog-to-digital converter, and said digital signature generator are implemented in a single integrated circuit chip.

24. The image sensor system of claim 16 further comprising a color processing circuit connected between said analog-to-digital converter and said digital signature generator.

25. The image sensor system of claim 16 wherein said image sensor comprises a CMOS image sensor in which each pixel comprises a light-sensitive circuit element and at least one sense transistor for sensing a charge on said light-sensitive circuit element, each sense transistor having a threshold voltage associated therewith; and wherein the FPN is a function of the threshold voltages of said sense transistors.

26. An image sensor system comprising:
an image sensor comprising an array of pixels forming an image plane for generating image data, the pixels having a light sensitivity which varies from one pixel to another in a non-predictable manner resulting in fixed pattern noise (FPN) unique to said image sensor;
at least one FPN cancellation circuit for providing an output based upon the image data;
at least one analog-to-digital converter for producing a digital image signal based upon the output of said at least one FPN cancellation circuit;
a digital signature generator for generating a digital signature based upon a sensor key and incorporating the digital signature in the digital image signal; and
a key generation circuit for generating the sensor key based upon the digital image signal;
said at least one FPN cancellation circuit being switchable between enabled and disabled modes of operation, and said key generation circuit generating the sensor key when said at least one FPN cancellation is in the disabled mode so that the sensor key is based upon FPN.

27. The image sensor system of claim 26 wherein the sensor key comprises a plurality of binary digits; and wherein said key generation circuit generates each digit of the sensor key by measuring and processing signal values of respective pluralities of pixels.

28. The image sensor system of claim 26 further comprising a timing circuit connected to said digital signature generator for generating timing information; and wherein said digital signature generator generates the digital signature based upon the sensor key and the timing information so that the digital image output by said image sensor for each image includes information defining a time when the image was taken.

29. The image sensor system of claim 28 wherein said timing circuit comprises a receiver for receiving time reference broadcast signals.

30. The image sensor system of claim 28 wherein said timing circuit comprises:
a clock; and
a receiver for intermittently receiving time reference broadcast signals for synchronizing said clock.

31. The image sensor system of claim 26 further comprising a number sequence generator connected to said digital signature generator for generating a number sequence; and wherein said digital signature generator generates the digital signature based upon the sensor key and the number sequence so that the digital image signal for each image output by said image sensor includes at least one number from the number sequence.

32. The image sensor system of claim 26 wherein said image sensor, said at least one FPN cancellation circuit, said at least one analog-to-digital converter, and said digital signature generator are implemented in a single integrated circuit chip.

33. The image sensor system of claim 26 further comprising a color processing circuit connected between said analog-to-digital converter and said digital signature generator.

34. An image sensor system comprising:
an image sensor for producing images and being of a type which produces fixed pattern noise;
a key generator for generating a sensor key using a measurement of the fixed pattern noise of said image sensor; and
a digital signature generator for generating a digital signature based upon the sensor key and attaching the digital signature to at least one image output by said image sensor.

35. The image sensor system of claim 34 wherein said image sensor comprises a plurality of pixels; and wherein said key generator generates the sensor key based upon pixel signals produced by said image sensor under predetermined illumination conditions.

36. The image sensor system of claim 35 wherein the sensor key comprises a plurality of binary digits; and wherein said key generator generates each of the plurality of binary digits by measuring and processing a respective plurality of pixel signals produced by said image sensor.

37. The image sensor system of claim 34 wherein said digital signature generator associates with the at least one image a time at which the at least one image was taken.

* * * * *